US008534650B2

(12) United States Patent
Humfeldt et al.

(10) Patent No.: US 8,534,650 B2
(45) Date of Patent: Sep. 17, 2013

(54) HOLDER SYSTEM FOR FASTENING AN AIRCRAFT INTERIOR COMPONENT TO A TRANSPORTING APPARATUS AND TO AN AIRCRAFT STRUCTURE

(75) Inventors: Dirk Humfeldt, Hamburg (DE); Thomas Basler, Jena (DE); Sebastian Umlauft, Hamburg (DE); Niklas Halfmann, Hamburg (DE); Dieter Krause, Buchholz (DE)

(73) Assignee: Airbus Deutschland GmbH (DE)

( * ) Notice: Subject to any disclaimer, the term of this patent is extended or adjusted under 35 U.S.C. 154(b) by 467 days.

(21) Appl. No.: 12/790,276

(22) Filed: May 28, 2010

(65) Prior Publication Data

US 2010/0301167 A1     Dec. 2, 2010

Related U.S. Application Data

(60) Provisional application No. 61/182,307, filed on May 29, 2009.

(30) Foreign Application Priority Data

May 29, 2009  (DE) .......................... 10 2009 023 400

(51) Int. Cl.
*B25B 1/20*     (2006.01)

(52) U.S. Cl.
USPC ............. 269/37; 269/17; 269/289 R; 269/309

(58) Field of Classification Search
USPC .............. 269/37, 309, 289 R, 17; 244/118.1, 244/118.5, 129.1, 137.1; 248/229.1, 229.11, 248/229.2, 229.21, 228.2, 231.31, 231.1
See application file for complete search history.

(56) References Cited

U.S. PATENT DOCUMENTS

| | | | | |
|---|---|---|---|---|
| 1,323,127 A * | 11/1919 | Treuthardt | ...................... | 269/45 |
| 4,490,883 A * | 1/1985 | Gauron | .......................... | 16/245 |
| 4,676,472 A * | 6/1987 | Kamrud, Sr. | .................. | 248/542 |
| 5,106,036 A * | 4/1992 | Sepstrup | .................... | 244/129.1 |
| 5,851,007 A * | 12/1998 | Swartzlander et al. | ......... | 269/17 |
| 6,905,115 B2 * | 6/2005 | Kato | ............................... | 269/17 |
| 7,461,816 B2 * | 12/2008 | Schwartz et al. | ......... | 244/117 R |
| 2007/0063100 A1 * | 3/2007 | Bailey et al. | ............... | 244/118.1 |
| 2008/0067729 A1 * | 3/2008 | McKown et al. | ............ | 269/313 |
| 2008/0073462 A1 * | 3/2008 | Wolf et al. | ................. | 244/118.1 |

* cited by examiner

*Primary Examiner* — Lee D Wilson
*Assistant Examiner* — Adam Barlow
(74) *Attorney, Agent, or Firm* — Barnes & Thornburg LLP

(57) ABSTRACT

A holder system for fastening an aircraft interior component to a transporting apparatus and to an aircraft structure includes an interior component holder configured to be connected to the interior component and which has a fastening device for fastening the interior component holder to the transporting apparatus. A structure holder is configured to be connected to the aircraft structure. A connecting element is fastened to the interior component holder and is configured to be connected to the structure holder in order to fasten the interior component to the aircraft structure.

17 Claims, 7 Drawing Sheets

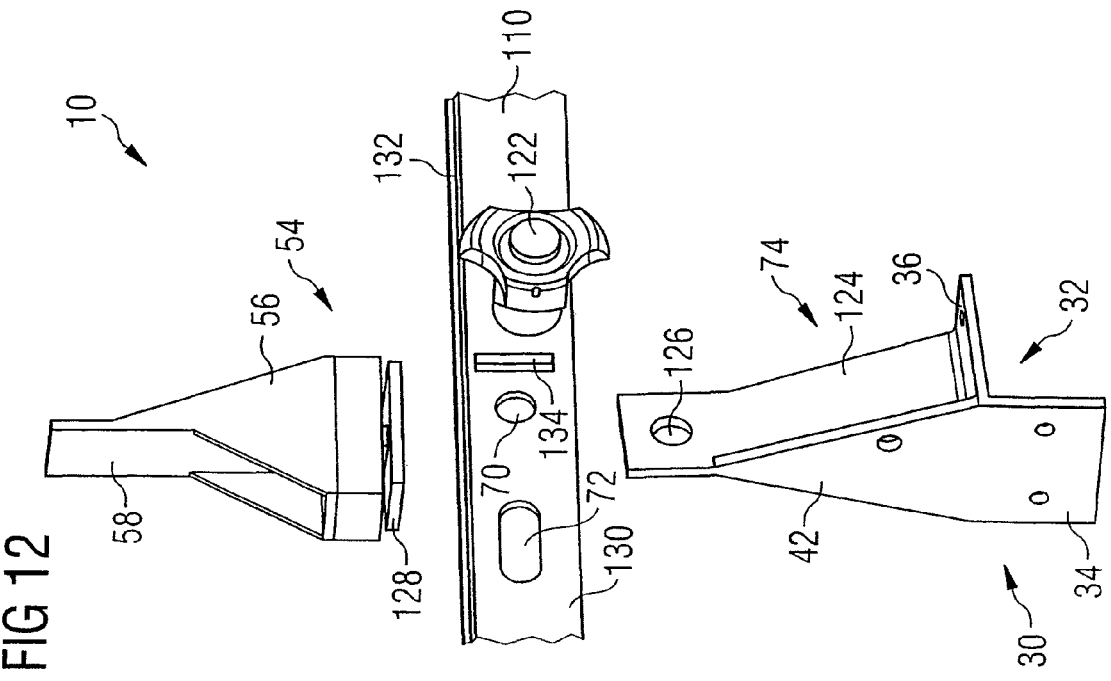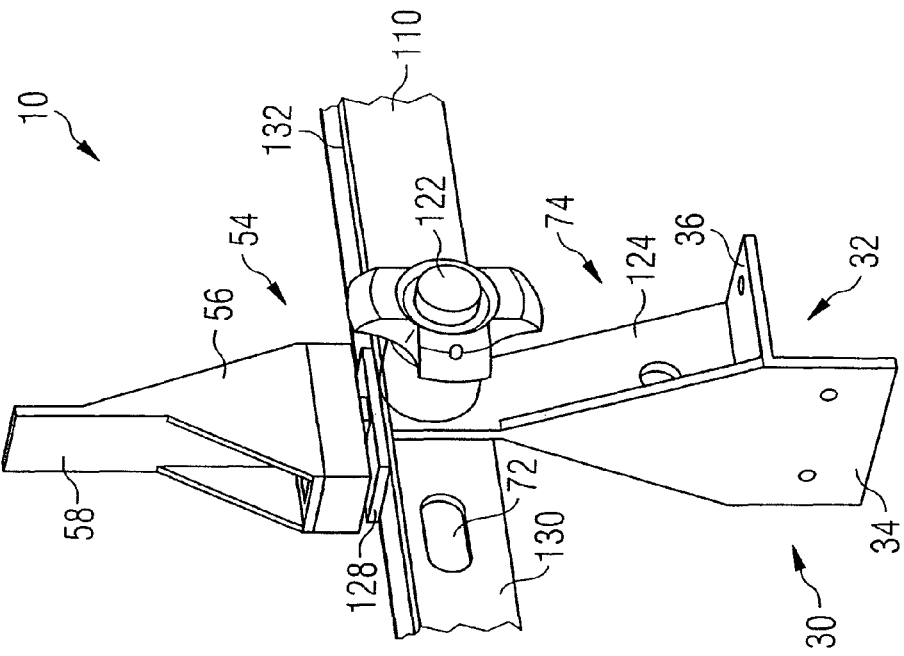

HOLDER SYSTEM FOR FASTENING AN AIRCRAFT INTERIOR COMPONENT TO A TRANSPORTING APPARATUS AND TO AN AIRCRAFT STRUCTURE

CROSS-REFERENCE TO RELATED APPLICATION

This application claims priority to U.S. Provisional Patent Application No. 61/182,307 filed May 29, 2009 and German Patent Application No. 10 2009 023 400.4, filed May 29, 2009, the disclosures of which are incorporated herein by reference.

FIELD OF THE INVENTION

The invention relates to a holder system which serves for fastening an interior component, intended for mounting in an aircraft, initially to a transporting apparatus and subsequently to an aircraft structure.

BACKGROUND

On the mounting of interior components in an aircraft, it is customary at present to connect components, such as, for example, dado panels, side coverings, ceiling coverings, light strips, luggage compartments and the like, individually to the aircraft structure. Since each component has to be separately positioned and fastened to the aircraft structure, the mounting of these components is very time-consuming. Similarly, for example, pipelines serving as air-conducting lines of an aircraft air-conditioning system or for water supply in an aircraft cabin, and also electric lines, are at present also fastened individually to the aircraft structure in a time-consuming manner. After mounting, the proper functioning of all the lines must be checked in a final inspection. In particular, all the pipelines have to undergo a tightness check, while in the case of the electric lines it is necessary to check all the interfaces. These tests are likewise relatively onerous, since the lines and interfaces to be checked are often accessible only with difficulty in the mounted state.

For this reason, efforts are being made to preassemble and test interior components provided for mounting in an aircraft, for example in an aircraft cabin, as extensively as possible outside the aircraft. In particular, large modules which may comprise a plurality of overhead luggage compartments, a plurality side covering panels and other interior components, such as, for example, electric lines, air-conducting lines of an aircraft air-conditioning system or pipelines serving for water supply in the aircraft cabin, personal service units and personal service channels, are to be preassembled and tested outside the aircraft, optionally with the aid of a suitable mounting apparatus configured for example in the form of a mounting frame. Subsequently, the large modules are to be transported by means of a transporting apparatus into a final mounting position in an aircraft fuselage element. Finally, in the aircraft fuselage element, the modules are to be connected to the aircraft structure in the simplest and most time-saving manner possible.

SUMMARY

The invention is directed to the object to provide a holder system which enables an interior component, intended for mounting in an aircraft, to be fastened initially to a transporting apparatus and subsequently to an aircraft structure in a simple, secure and time-saving manner.

To achieve this object, a holder system according to the invention for fastening an aircraft interior component to a transporting apparatus and to an aircraft structure comprises an interior component holder which is configured to be connected to the interior component and which comprises a fastening device for fastening the interior component holder to the transporting apparatus. The interior component which can be fastened to a transporting apparatus and to an aircraft structure with the aid of the holder system according to the invention may be any desired interior component preassembled outside the aircraft, such as, for example, an overhead luggage compartment. Preferably, however, the interior component is an interior component module which may comprise a plurality of overhead luggage compartments, a plurality of side covering panels and other interior components, such as, for example, electric lines, air-conducting lines of an aircraft air-conditioning system or pipelines serving for water supply in the aircraft cabin, personal service units and personal service channels.

The transporting apparatus serves for transporting the interior component, preassembled outside the aircraft, into a final mounting position in the aircraft fuselage element. For example, the transporting apparatus may comprise an undercarriage and an interior component carrier unit. The interior component holder can then be fastened to the interior component carrier unit of the transporting apparatus by means of the fastening device, a holder complementary to the interior component holder preferably being provided on the interior component carrier unit of the transporting apparatus and, on fastening the interior component to the transporting apparatus, cooperating with the interior component holder in order to fasten the interior component holder and thus the interior component to the transporting apparatus. The interior component holder of the holder system according to the invention thus enables, in particular in cooperation with a complementary holder provided on the transporting apparatus, a simple and secure fastening of the interior component to the transporting apparatus.

The holder system according to the invention further comprises a structure holder which is configured to be connected to the aircraft structure. For example, the structure holder may be provided for fastening to frames of an aircraft fuselage element. The aircraft fuselage element, in which interior components, preassembled outside the aircraft and transported by means of the transporting apparatus into their final mounting position in the aircraft fuselage element, can be finally mounted, may be for example a fuselage shell open at at least one end side. Alternatively to this, however, the aircraft fuselage element may also be a virtually completely or completely constructed aircraft fuselage. All that is essential is for the aircraft fuselage element to have an access which enables the interior components preassembled outside the aircraft to be brought into their final mounting position in the aircraft fuselage element.

Finally, the holder system according to the invention comprises a connecting element fastened to the interior component holder. The connecting element is configured to be connected to the structure holder in order to fasten the interior component to the aircraft structure. By means of the connecting element, the interior component holder and thus the interior component connected to the interior component holder can be fastened to the structure holder before the interior component holder is uncoupled from the transporting apparatus. As a result, it is ensured that the interior component is always sufficiently secured.

The holder system according to the invention has the advantage that it enables simple and convenient transporting of interior components preassembled outside the aircraft into a final mounting position in an aircraft fuselage element. Furthermore, the final mounting of the interior components in the aircraft fuselage element is significantly facilitated by the holder system according to the invention. By using the holder system according to the invention, the process for mounting interior components in an aircraft can thus be made more efficient overall.

The interior component holder of the holder system according to the invention preferably comprises an interface element which is configured to be connected to the interior component for the purpose of fastening the interior component holder to the interior component. The interface element may have, for example, at least one base plate which is provided with a plurality of bores for receiving suitable fastening means, such as, for example, bolts or screws, for fastening the interior component holder to the interior component. Preferably, the interface element of the interior component holder comprises a first base plate and a second base plate connected to the first base plate and extending substantially perpendicularly to the first base plate. In other words, the two base plates of the interface element preferably form an L-profile and can thus be fastened to a side wall and to a top panel of the interior component.

For example, the first base plate may be attached to a side wall of an overhead luggage compartment, while the second base plate may be mounted on a top panel of the overhead luggage compartment. Such a configuration of the interface element enables fastening of the interior component holder to an interior component in regions of the interior component which, in the finally mounted state of the interior component, are not part of the visible regions of the interior component. The optical appearance of the interior component in the finally mounted state is thus not impaired by the interior component holder.

The fastening device of the interior component holder is preferably configured to be received in a bearing device of a fixed bearing or a movable bearing which is formed on a holder fixed to the transporting apparatus. In other words, the fastening device of the interior component holder is equally suited to reception in a bearing device of a fixed bearing and a bearing device of a movable bearing.

For example, the fastening device of the interior component holder may comprise a bolt which extends from a fastening element of the interior component holder. The fastening element may be of plate-shaped design and be formed in one piece with the first base plate of the interface element. In the case of such an arrangement, the fastening element preferably extends, in a continuation of the first base plate, perpendicularly to the second base plate of the interface element. In the mounted state of the interior component holder on an interior component configured, for example, as an overhead luggage compartment, the fastening element can thus extend perpendicularly to a top panel of the overhead luggage compartment, so that a suspended fastening of the interior component to the transporting apparatus is possible. A suspended fastening of the interior component to the transporting apparatus has the advantage that it is not necessary to support the interior component in regions which form visible regions of the interior component in the finally mounted state of the interior component in an aircraft. The visual appearance of the interior component is thus not impaired by the transporting on the transporting apparatus.

The bolt of the fastening device can pass through a bore formed in the fastening element and be provided for reception in the bearing device of the fixed bearing or the movable bearing which is formed on the holder fixed to the transporting apparatus. A particularly simple and secure reception of the bolt in the bearing device of the fixed bearing or the movable bearing is ensured when the bolt extends substantially perpendicularly to the fastening element, i.e. substantially horizontally and, in the state of the interior component holder and the interior component connected to the transporting apparatus, parallel to a longitudinal axis of the transporting apparatus. A bolt passing through a bore formed in the fastening element can be fastened to the fastening element by means of a nut. Furthermore, if desired, the bolt may bear a head which is provided for reception in the fixed bearing or the movable bearing which is formed on the holder fixed to the transporting apparatus.

The structure holder of the holder system according to the invention preferably comprises a first receiving device and a second receiving device adjacent to the first receiving device. The first and the second receiving device can be configured to cooperate with two connecting elements fastened to corresponding interior component holders. In the case of such a configuration of the structure holder, it is possible to fasten two interior component holders to merely one structure holder by means of corresponding connecting elements. Such a configuration of the holder system according to the invention is particularly suitable when the interior component is configured in the form of an interior component module and a plurality of interior component holders are required to fasten the interior component to the transporting apparatus and the aircraft structure.

When the structure holder comprises two receiving devices, preferably at least one of the receiving devices is provided with a tolerance compensation device. As a result, the receiving device not provided with a tolerance compensation device may, for example, be used for the proper positioning of a connecting element, and thus an interior component connected via a corresponding interior component holder to the connecting element, relative to the structure element. As a result, it can be ensured that the interior component is finally-mounted in the desired position in the aircraft fuselage element. The receiving device provided with a tolerance compensation device, in contrast, may be connected to a further connecting element, without dimensional or mounting tolerances of the interior component, the interior component holder and/or the connecting elements impairing the proper mounting of the connecting element on the structure holder.

The structure holder may comprise a mounting rail which can be fastened to the aircraft structure by means of a mounting element. In the state fastened to the aircraft structure, the mounting rail may extend substantially parallel to the longitudinal axis of the aircraft fuselage element. By means of the mounting element, the mounting rail may be fastened, for example, to a frame or a plurality of frames of the aircraft structure, so that the mounting rail extends, for example, substantially perpendicularly to the frames of the aircraft structure in the state fastened to the aircraft structure. The mounting rail may be of comparatively short design and be provided for connection to merely one connecting element fastened to a corresponding interior component holder or merely two connecting elements fastened to corresponding interior component holders. Alternatively to this, however, the mounting rail may also have such a length that the mounting rail extends over a plurality of frame widths in the state mounted on the aircraft structure. In the case of such an arrangement, the mounting rail may comprise a series of first and second receiving devices, so that the mounting rail may be connected to a plurality of connecting elements fastened to corresponding interior component holders.

The first receiving device(s) is/are preferably configured in the form of a circular bore. The second receiving device(s) of the mounting rail, in contrast, is/are preferably configured in the form of an elongated hole. In the case of a second receiving device configured in the form of an elongated hole, the tolerance compensation device is formed by the area regions of the elongated hole by which the area of the elongated hole is greater than a cross-sectional area of a fastening means to be fastened in the elongated hole. To fasten a connecting element, attached to a corresponding interior component holder, to the mounting rail, screws, rivets, bolts, and in particular quick release pins, as well as other suitable fastening means, may be used.

The mounting rail of the structure holder may comprise a first stop element which is configured to cooperate with a connecting element, on connecting the connecting element, fastened to a corresponding interior component holder, to a structure holder fixed to the aircraft structure, in order to limit a mounting movement of the connecting element in the direction of the structure holder, i.e. a horizontal mounting movement perpendicular to the longitudinal axis of the aircraft fuselage element (y-direction). The first stop element may be formed by a main surface of the mounting rail which is preferably vertically oriented in the mounted state of the structure holder on the aircraft structure. A mounting movement of the connecting element in the y-direction is then limited by the connecting element striking the main surface of the mounting rail.

Furthermore, the mounting rail of the structure holder may comprise a second stop element which is configured to cooperate with a connecting element, on connecting the connecting element, fastened to a corresponding interior component holder, to a structure holder fixed to the aircraft structure, in order to limit a mounting movement of the connecting element in a direction perpendicular to the longitudinal axis of the aircraft fuselage element, that is to say a vertical mounting movement in the z-direction. The second stop element may be formed by an element extending substantially perpendicularly to the main surface of the mounting rail. For example, the mounting rail may be configured in the form of an L-profile, so that the main surface of the mounting rail is bounded, at its lower edge directed away from the mounting element, but preferably at its upper edge directed towards the mounting element, by the second stop element. Alternatively to this, however, the second stop element may also be designed in the form of a stop projection which extends substantially perpendicularly to the main surface of the mounting rail.

Finally, the mounting rail of the structure holder may comprise a third stop element which is configured to cooperate with a connecting element, on connecting the connecting element, fastened to a corresponding interior component holder, to a structure holder fixed to the aircraft structure, in order to limit a mounting movement of the connecting element in a direction parallel to the longitudinal axis of the aircraft fuselage element, that is to say a horizontal mounting movement of the connecting element in the x-direction. The third stop element is preferably formed by a stop projection which extends substantially perpendicularly from the main surface of the mounting rail.

When the mounting rail of the structure holder is provided with a first, a second and a third stop element, the mounting movement of the connecting element can be limited in all three spatial directions, so that simple positioning of the connecting element relative to the structure holder and consequently simple fastening of the connecting element to the structure holder is enabled. When the mounting rail is provided for connection to more than one connecting element, it is sufficient for the mounting rail to comprise merely one first, second and third stop element, it then being possible for the stop elements to be configured to cooperate with a connecting element which is provided for fastening to the mounting rail by means of a receiving device without tolerance compensation. The interior component can then be positioned, by the cooperation of this connecting element with the stop elements, as desired in its final mounting position relative to the structure holder. Subsequently, all of the connecting elements connected to corresponding interior component holders can be connected by means of corresponding receiving devices to the structure holder.

The mounting rail of the structure holder may further comprise at least one guiding device, assigned to the first and/or the second receiving device, for guiding a fastening means on connecting a connecting element, fastened to a corresponding interior component holder, to the structure holder. The guiding device facilitates the mounting of the fastening means. For example, the guiding device may comprise a guiding funnel which extends from the mounting rail and surrounds the first and/or the second receiving device. The guiding funnel may have a greater circumference in a region directed away from the mounting rail than in a region directed towards the mounting rail. As a result, a fastening means, such as, for example, a screw, can be inserted much more easily into a first receiving device configured, for example, in the form of a circular bore and a second receiving device configured, for example, in the form of an elongated hole. As a result, the fastening of a connecting element, connected to a corresponding interior component holder, to the structure holder is simplified.

The mounting rail and the mounting element may be configured to fasten the mounting rail to the mounting element in different positions. For example, the mounting element may comprise a fastening component, provided for connection to the aircraft structure and for example of plate-shaped design, and a connecting plate, to which the mounting rail can be fastened in different positions by suitable fastening means, such as, for example, screws or bolts. The mounting rail may have a plurality of bores, arranged in a manner distributed along the rail, for receiving these fastening means. If the mounting rail is configured in the form of an L-profile and the component of the mounting rail forming the second stop element bounds the main surface of the mounting rail at an upper edge directed towards the mounting element, the bores for receiving the fastening means for fastening the mounting rail to the mounting element can be made, for example, in this component of the mounting rail forming the second stop element.

Alternatively to this, the mounting rail may also have a projection of, for example T-shaped configuration in a region directed towards the mounting element, which projection may be displaceably received in a correspondingly shaped slot of the mounting element. The fastening of the mounting screw to the mounting element may then be effected, for example, by a screw or a bolt which passes through a circular bore made in the mounting element and an elongated hole formed in the projection of the mounting rail.

In an alternative embodiment of the holder system according to the invention, the structure holder may also comprise a mounting shaft which is fastenable to the aircraft structure by means of a mounting element. The structure holder then preferably comprises a first receiving device formed by a first region of the mounting shaft and a second receiving device formed by a second region of the mounting shaft. The structure holder is then provided for connection to a connecting element which is shaped in such a manner that it can be fastened to the structure holder by cooperation with a region of the mounting shaft forming the first or the second receiving device.

The mounting element may comprise a fastening component, provided for connection to the aircraft structure and for example of plate-shaped configuration, and a bearing element for bearing the mounting shaft. Preferably, the bearing element is provided with a receiving opening, so that the mounting shaft can pass through the bearing element of the mounting element. In the mounted state of the structure holder on the aircraft structure, the mounting shaft preferably extends parallel to the longitudinal axis of the aircraft fuselage element. In the case of a configuration of the structure holder with a mounting shaft passing through a bearing element of the mounting element, the first receiving device is formed by a first region of the mounting shaft which extends from the bearing element in a first direction. The second receiving device, in contrast, is formed by a second region of the mounting shaft which extends from the bearing element in a second direction, opposite the first direction.

The mounting shaft and the bearing element are preferably configured to fasten the mounting shaft to the mounting element in different positions. For example, the mounting shaft may be provided with an external thread which is provided for cooperation with an internal thread formed in the bearing element. By rotation of the mounting shaft, the mounting shaft can then be moved, in the direction of the longitudinal axis of the mounting shaft, relative to the bearing element and thus the mounting element into a desired position. By movement of the mounting shaft relative to the bearing element and the mounting element, the dimensions of the regions of the mounting shaft forming the first and the second receiving device can be adjusted as desired.

In principle, it is possible to position the mounting shaft relative to the bearing element in such a manner that the first and the second receiving device are formed by equal-length regions of the mounting shaft. In order to provide the second receiving device with a tolerance compensation device, however, the mounting shaft is preferably positioned relative to the bearing element in such a manner that the region of the mounting shaft forming the first receiving device is shorter than the region of the mounting shaft forming the second receiving device. The tolerance compensation device is then formed by a section of the region of the mounting shaft forming the second receiving device by which this region of the mounting shaft extends further in the direction of the longitudinal axis of the mounting shaft than a component of the connecting element provided for cooperation with the region of the mounting shaft forming the first receiving device.

The mounting element preferably further comprises a securing device which serves for securing the mounting shaft in a desired position relative to the bearing element. For example, the mounting shaft may bear a ring of holes. The bearing element, in contrast, may be provided, in a region surrounding the receiving opening for receiving the mounting shaft, with a bore, the size of which is adapted to the size of the openings made in the ring of holes. An opening made in the ring of holes can then be brought into coincidence with the bore. Finally, a locking pin can be inserted through the bore formed in the bearing element and through an opening of the ring of holes. The locking pin thus secures the mounting shaft against unintended rotation relative to the bearing element.

Furthermore, the mounting element may be provided at its two ends with securing elements which may have a greater diameter than the mounting shaft itself. Through the securing elements, an undesired displacement of a connecting element, cooperating with the mounting shaft, in a direction parallel to the longitudinal axis of the mounting shaft can be prevented. In other words, the securing elements prevent a component of a connecting element which cooperates with the mounting shaft from slipping off the mounting shaft at the ends of the mounting shaft.

The connecting element of the holder system according to the invention may comprise a connecting plate. The connecting plate may be provided with a bore for receiving a fastening means, such as, for example, a screw or bolt, and in particular a quick release pin. The connecting element can then be connected to the structure holder in a simple and convenient manner by the fastening means. Furthermore, on fastening the connecting element to the structure holder, suitable components, such as, for example, shock mounts or the like, may be used which enable acoustic and/or at least partial mechanical uncoupling of the structure holder from the connecting element and thus the interior component holder connected to the connecting element, and the interior component connected to the interior component holder.

Particularly simple production of the holder system according to the invention is possible in particular when the connecting plate of the connecting element is formed in one piece with the interior component holder. For example, the connecting plate of the connecting element may extend substantially perpendicularly to the base plates of the interface element of the interior component holder from the second base plate of the interface element. A connecting element provided with a connecting plate is suitable in particular for connection to a structure holder which comprises a mounting rail which can be fastened to the aircraft structure by means of a mounting element.

Alternatively to this, however, the connecting element may also comprise a base body which can be fastened to the interior component holder for the purpose of connecting the connecting element to the interior component holder. For example, the base body of the connecting element may be fixed to the fastening element of the interior component holder, which also bears the fastening device of the interior component holder.

Furthermore, the connecting element may comprise a gripping arrangement connected to the base body. The gripping arrangement preferably comprises an open end, a first bearing face, a second bearing face opposite the first bearing face, and a stop face bounding the first and the second bearing face. The mutually opposite bearing faces are preferably formed on two mutually opposite gripping bodies. The spacing of the bearing faces is preferably chosen such that a mounting shaft of a structure holder can be received between the bearing faces.

By insertion of the mounting shaft between the bearing faces, proper positioning of the connecting element and thus the interior component holder and the interior component itself in the vertical direction is automatically enabled. The stop face bounding the first and the second bearing face serves for the proper positioning of the connecting element and thus the interior component holder and the interior component relative to the structure holder in the horizontal direction perpendicular to the longitudinal axis of the aircraft fuselage element, that is to say in the y-direction. Finally, proper positioning of the connecting element and thus the interior component holder and the interior component itself in the horizontal direction parallel to the longitudinal axis of the aircraft fuselage element, that is to say in the x-direction, is ensured by suitable positioning of the mounting shaft relative to the bearing element. The mounting shaft can be received particularly securely in the gripping arrangement of the connecting element when the stop surface bounding the first and the second bearing face is of curved shape, that is to say has a shape which is adapted to the shape of the mounting shaft.

The gripping arrangement of the connecting element may comprise a securing device which is configured to secure the gripping arrangement in its position when, on connecting the connecting element to the structure holder, a mounting shaft of the structure holder has been received in a desired position in the gripping arrangement. The securing device may, for example, be a spring-loaded bolt or a stop bolt which extends from the first and/or the second bearing face. Such a bolt is preferably provided, in a region directed towards the open end of the gripping arrangement, with an inclined guiding face which facilitates the insertion of the mounting shaft into the desired position in the gripping arrangement. Similarly, the gripping bodies of the gripping arrangement may also be provided, in the region of the open end of the gripping arrangement, with inclined guiding faces adjoining the first and/or the second bearing face, which facilitate the insertion of the mounting shaft into the gripping arrangement.

BRIEF DESCRIPTION OF THE DRAWINGS

Preferred embodiments of the holder system according to the invention will now be explained in more detail with reference to the appended schematic drawings, of which FIG. 11 shows a three-dimensional illustration of a still further embodiment of a holder system for fastening an aircraft interior component to a transporting apparatus and to an aircraft structure, and FIG. 12 shows a three-dimensional exploded view of the holder system according to FIG. 11.

DETAILED DESCRIPTION OF THE DRAWINGS

Figure 6:
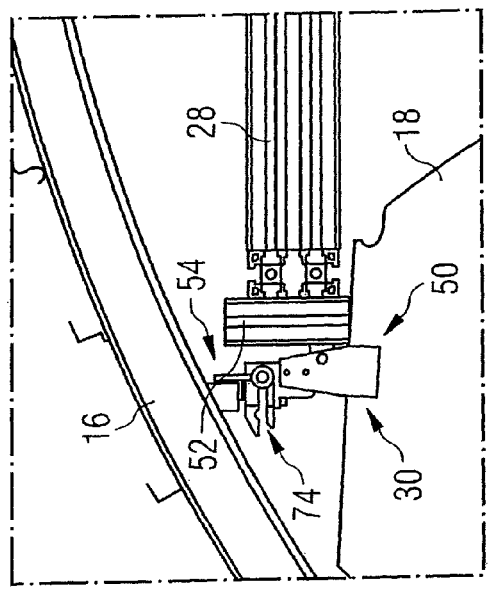
FIG. 6 shows a detail view of the holder system according to FIG. 1 in cooperation with the transporting apparatus illustrated in FIG. 5 and with an aircraft structure.
Figure 5:
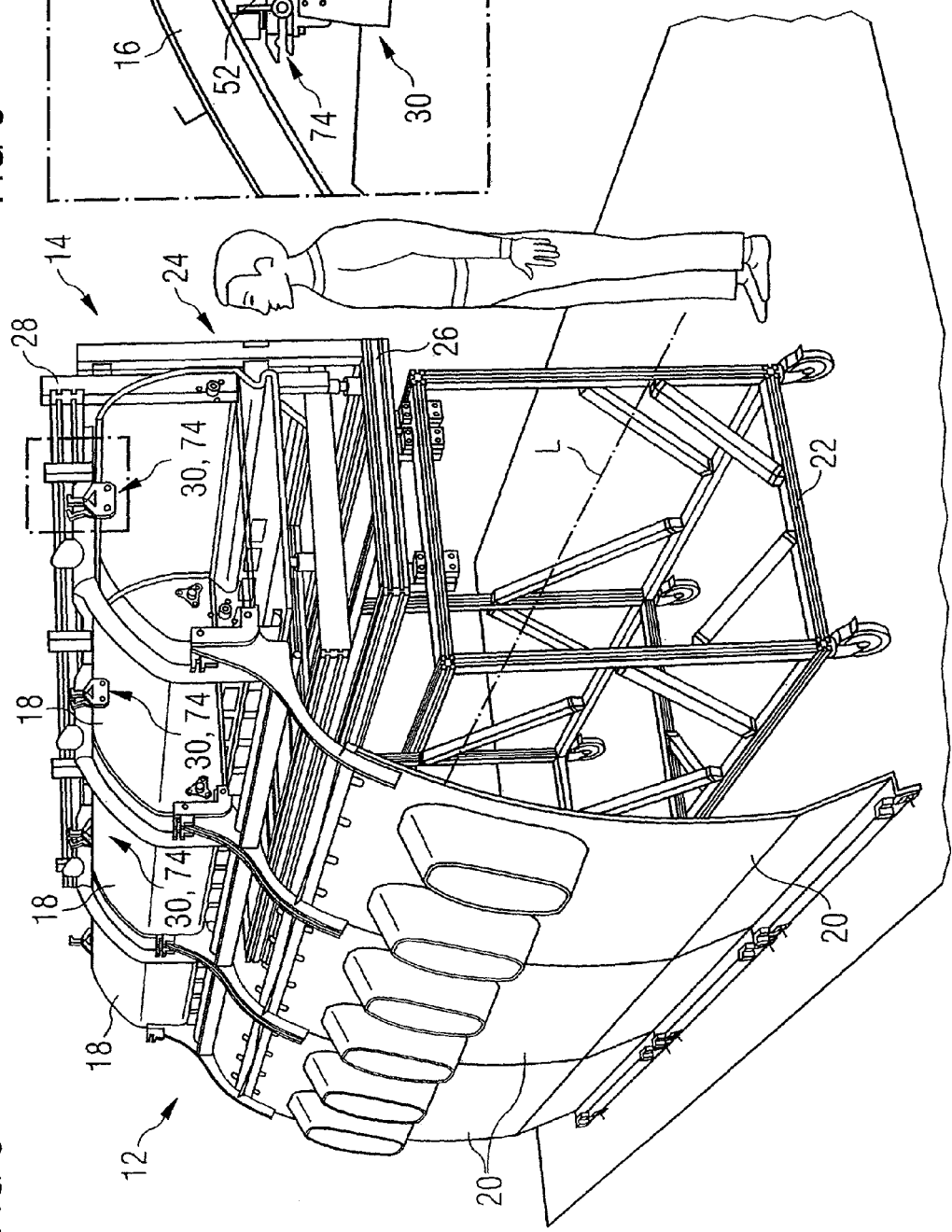
FIG. 5 shows a three-dimensional view of a transporting apparatus, to which an aircraft interior component provided for mounting in an aircraft fuselage element is fastened by means of the holder system according to FIG. 1.

FIGS. 1-12 show various embodiments of a holder system 10 which serves for fastening an aircraft interior component 12 to a transporting apparatus 14 and to an aircraft structure 16 (see FIGS. 5 and 6). The interior component 12 in the case of the arrangement shown in the figures is a large module which is provided for preassembly outside an aircraft fuselage element and comprises three overhead luggage compartments 18 and three side covering panels 20 which are each connected to the overhead luggage compartments 18. Furthermore, the large module constituting the interior component 12 may comprise other components, such as, for example, electric lines, air- or water-conducting lines of an aircraft air-conditioning system or pipelines serving for water supply in the aircraft cabin, personal service units and personal service channels.

The transporting apparatus 14 is used to transport the interior component module 12, which has been preassembled outside the aircraft fuselage element and also already tested as extensively as possible outside the aircraft fuselage element, into a final mounting position in the aircraft fuselage element. The aircraft fuselage element may, for example, be a fuselage shell which is open at at least one end side and enables unhindered transporting of the interior component 12 into its final mounting position in the interior of the aircraft fuselage element.

The transporting apparatus 14 comprises an undercarriage 22, on which an interior component carrier unit 24 configured in two parts is supported. The interior component carrier unit 24 comprises an L-carrier unit 26 connected directly to the undercarriage 22 and a C-carrier unit 28 connected to the L-carrier unit 26. The undercarriage 22 and the carrier units 26, 28 of the interior component carrier unit 24 are constructed from a plurality of struts.

The L-carrier unit 26 of the interior component carrier unit 24 is movable horizontally relative to the undercarriage 22 via a sliding unit, it being possible for the L-carrier unit 26 to be movable horizontally relative to the undercarriage 22 in only direction, that is to say, for example, perpendicularly to a longitudinal axis L of the transporting apparatus 14, or in two directions, that is to say, for example, both perpendicularly and parallel to the longitudinal axis L of the transporting apparatus 14, as required. Furthermore, the C-carrier unit 28 of the interior component carrier unit 24 is movable vertically relative to the L-carrier unit 26. Through the movable arrangement of the C-carrier unit 28 and the L-carrier unit 26, the horizontal and the vertical position of the interior component carrier unit 24 and thus the horizontal and the vertical position of an interior component module 12 connected to the interior component carrier unit 24 can be finely adjusted on the final mounting in the aircraft fuselage element.

As can be seen in FIG. 5, the interior component 12 is connected to the transporting apparatus 14 by a plurality of holder systems 10. Each holder system 10, illustrated in detail in FIGS. 1-4, 6 and 7, comprises an interior component holder 30. By means of the interior component holders 30 of the holder systems 10, the overhead luggage compartments 18 and thus the entire interior component 12 configured in the form of a large module can be fastened in a suspended manner to the structure 16 of an aircraft fuselage element. During the transporting of the interior component 12 on the transporting apparatus 14, in contrast, the interior component holders 30 serve for the suspended fastening of the interior component 12 to the transporting apparatus 14. Consequently, it is not necessary to support the interior component 12 in regions which are visible in the finally mounted state of the interior component 12. As a result, a visually optimal appearance of the interior component 12 is ensured.

Each interior component holder 30 has an interface element 32 provided for connection to the interior component 12. The interface element 32 comprises a first base plate 34 and a second base plate 36 extending substantially perpendicularly to the first base plate 34. The base plates 34, 36 are each provided with bores, through which suitable fastening means, such as, for example, screws or bolts can be passed in order to fasten the base plates 34, 36 of the interface element 32 and thus the interior component holder 30 to the interior component 12. In particular, the interface element 32 is fastened to an overhead luggage compartment 18 constituting part of the interior component 12 in such a manner that the first base plate 34 bears against a side wall of the overhead luggage compartment, while the second base plate 36 cooperates with a top panel of the overhead luggage compartment 18. The interface element 32 thus cooperates with regions of the interior component 12 which are not visible in the finally mounted state of the interior component 12. As a result, impairment of the visual appearance of the interior component 12 is reliably avoided.

Figure 7:
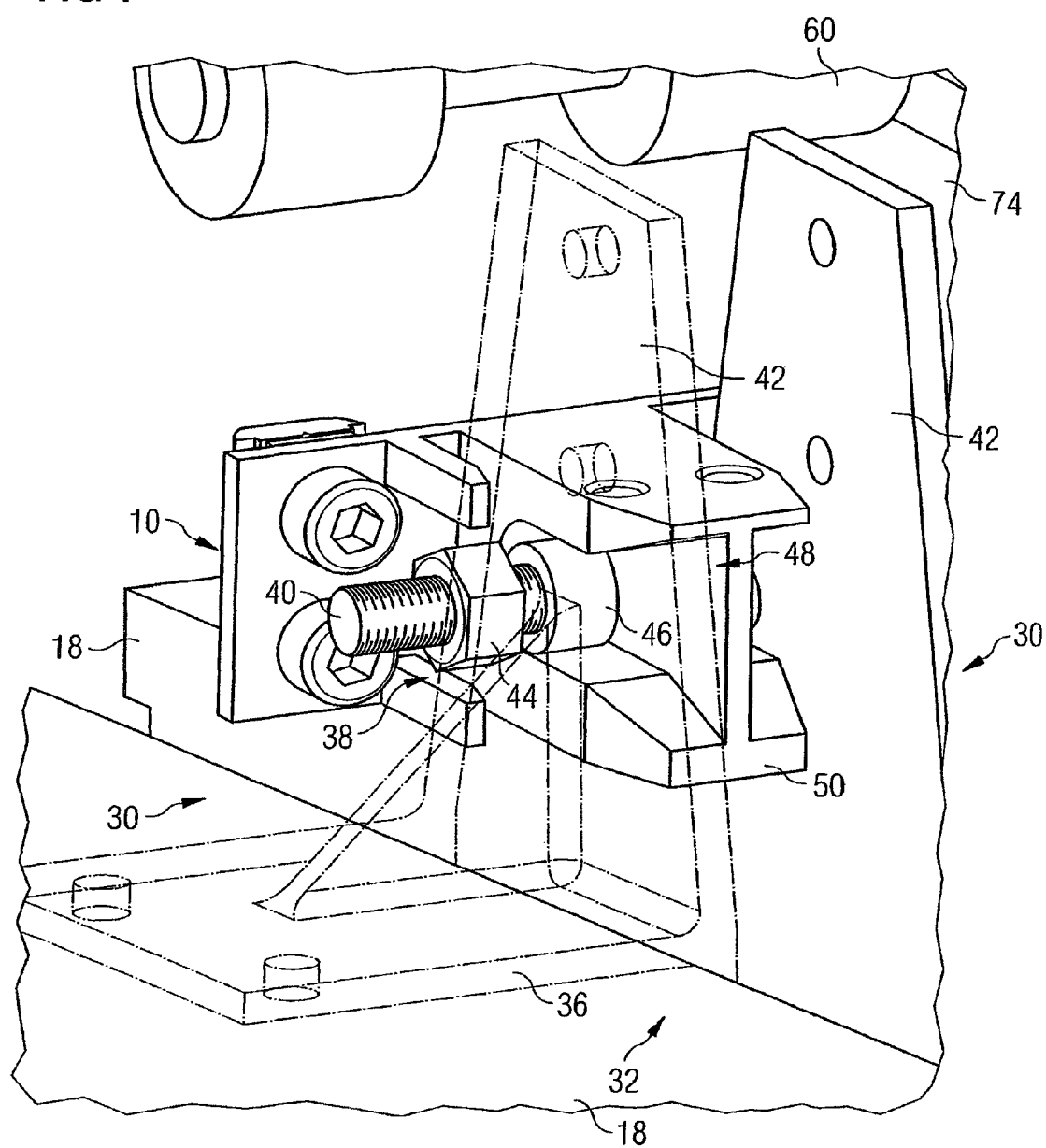
FIG. 7 shows a three-dimensional detail view of the arrangement according to FIG. 6.

As can be seen in FIG. 7, the interior component holder 30 further comprises a fastening device 38 which serves for fastening the interior component holder 30 to the transporting apparatus 14 during the transporting of the interior component 12 on the transporting apparatus 14. The fastening device 38 comprises a bolt 40 which passes through a bore formed in a fastening element 42 of the interior component holder 30. The fastening element 42 is designed in one piece with the interface element 32 and extends, in a continuation of the first base plate 34, perpendicularly to the second base plate 36.

The bolt 40 is fixed to the fastening element 42 by means of a nut 44. A head 46 of the bolt 40 is provided for reception in a bearing device 48 of a fixed bearing or a movable bearing which is formed on a holder 50 fixed to the transporting apparatus 14.

As can best be seen in FIGS. 5 and 6, a plurality of holders 50 are fastened to a strut 52, extending parallel to the longitudinal axis of the transporting apparatus 14, of the C-carrier 28. Each holder 50 has a fixed bearing and a movable bearing, so that each holder 50 is able to cooperate with two interior component holders 30 arranged adjacent to one another. With the aid of the fastening device 38, each interior component holder 30 can thus cooperate with a corresponding holder 50 fixed to the transporting apparatus 14, in order to fasten the interior component 12 securely to the transporting apparatus 14.

The holder system 10 further comprises a structure holder 54. The structure holder 54 comprises a mounting element 56 which serves for fastening the structure holder 54 to the aircraft structure 16, for example to a frame of the aircraft structure 16, see FIG. 6. The mounting element 56 has a plate-shaped fastening component 58 and a bearing element 60. The bearing element 60 has a mounting shaft 62 passing through it.

On the mounting shaft 62 there is formed an external thread which is provided for cooperating with an internal thread provided in the bearing element 60. Through the cooperation of the external thread formed on the mounting shaft 62 with the internal thread provided in the bearing element 60, the position of the mounting shaft 62 can be varied and consequently set as desired by rotation of the mounting shaft 62 relative to the bearing element 60. In order to fix the mounting shaft 62 in a desired position, that is to say secure it against unintended rotation relative to the bearing element 60, the mounting shaft 62 bears a ring of holes 64, see in particular FIG. 4. Furthermore, a bore 66 is made in the bearing element 60. By suitable rotation of the mounting shaft 62 relative to the bearing element 60, an opening made in the ring of holes 64 can be brought into coincidence with the bore 66. Subsequently, a locking pin 68 can be inserted into the opening of the ring of holes 64 and the bore 66 formed in the bearing element 60, in order to prevent further rotation of the mounting shaft 62 relative to the bearing element 60.

Figure 1:
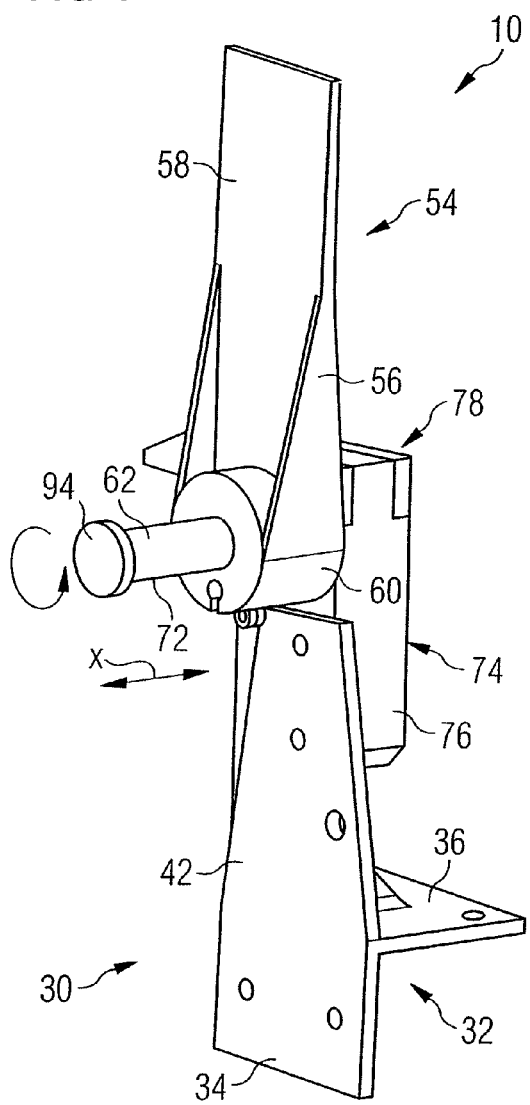
FIG. 1 shows a three-dimensional illustration of a first embodiment of a holder system for fastening an aircraft interior component to a transporting apparatus and to an aircraft structure.
Figure 2:
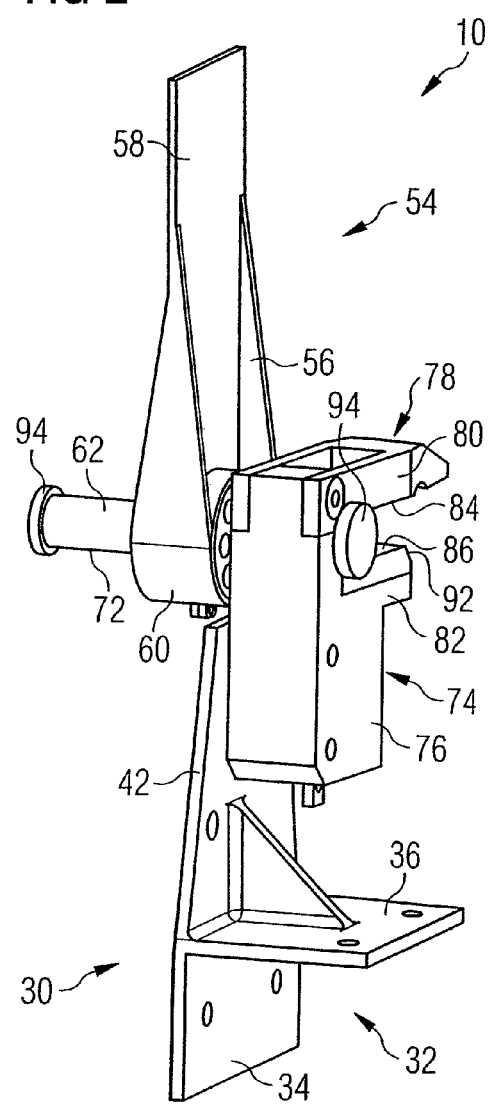
FIG. 2 shows a further three-dimensional illustration of the holder system according to FIG. 1.

As can best be seen in FIGS. 1 and 2, regions of the mounting shaft 62 which extend in opposite directions from the bearing element 60 serve as a first and as a second receiving device 70, 72. The receiving devices 70, 72 are provided for cooperating with two connecting elements 74 fastened to corresponding interior component holders 30. For greater clarity, only one interior component holder 30 and one connecting element 74 are shown in each of the figures. Through the cooperation of the connecting element 74 with one of the receiving devices 70, 72, the connecting element 74 connected to the interior component holder 30 and thus the interior component 12 can be connected to the structure holder 54. As a result, the interior component 12 is fastened to the aircraft structure 16, see FIG. 6. In particular, such an arrangement enables fastening of the interior component to the aircraft structure 16 before the interior component 12 is uncoupled from the transporting apparatus.

The connecting element 74 comprises a base body 76 fastened to the interior component holder 30, that is to say to the fastening element 42 of the interior component holder 30. Furthermore, the connecting element 74 comprises a gripping arrangement 78 having two gripping bodies 80, 82 arranged at a distance from one another, and thus an open end. Formed on the gripping bodies 80, 82 is a first bearing face 84 and a second bearing face 86 opposite the first bearing face 84. The first and the second bearing face 84, 86 are bounded by a stop face 88. The stop face 88 is of curved shape and adapted to the shape of the mounting shaft 62. On connecting the connecting element 74 to the structure holder 54, a receiving device 70, 72 of the mounting shaft 62 can thus be received in the gripping arrangement 78 of the connecting element 74.

In the mounted state of the structure holder 54 on the aircraft structure 16, the mounting shaft 62 of the structure holder 54 extends parallel to the longitudinal axis of the aircraft fuselage element and parallel to the longitudinal axis L of the suitably positioned transporting apparatus 14. When the connecting element 74 has reached a position in which the mounting shaft 62 of the structure holder 54 is received in the gripping arrangement 78, the connecting element 74 and thus the interior component 12 is automatically vertically positioned as desired. Through the cooperation of the mounting shaft 62 with the stop face 88 of the connecting element 74, positioning of the connecting element 74 and thus the interior component 12 horizontally and perpendicularly to the longitudinal axis of the aircraft fuselage element and the transporting apparatus 14, that is to say in the y-direction, is brought about. Desired positioning of the connecting element 74 and thus the interior component 12 in the x-direction, that is to say horizontally parallel to the longitudinal axis of the aircraft fuselage element and the transporting apparatus 14, is enabled by suitable positioning of the mounting shaft 62 relative to the bearing element 60.

In particular, by positioning of the mounting shaft 62 relative to the bearing element 60 in such a manner that the region of the mounting shaft 62 forming the first receiving device 70 is shorter in the direction of the longitudinal axis of the mounting shaft 63 than the region of the mounting shaft forming the second receiving device 72, the second receiving device 72 is provided with a tolerance compensation device. As a result, a first connecting element 74 can be connected to the first receiving device 70 and thereby positioned as desired. For a further connecting element 74 which is to be connected to the second receiving device 72, in contrast, the compensation of production and mounting tolerances is possible through the design of the second receiving device 72 with a tolerance compensation device.

Figure 3:
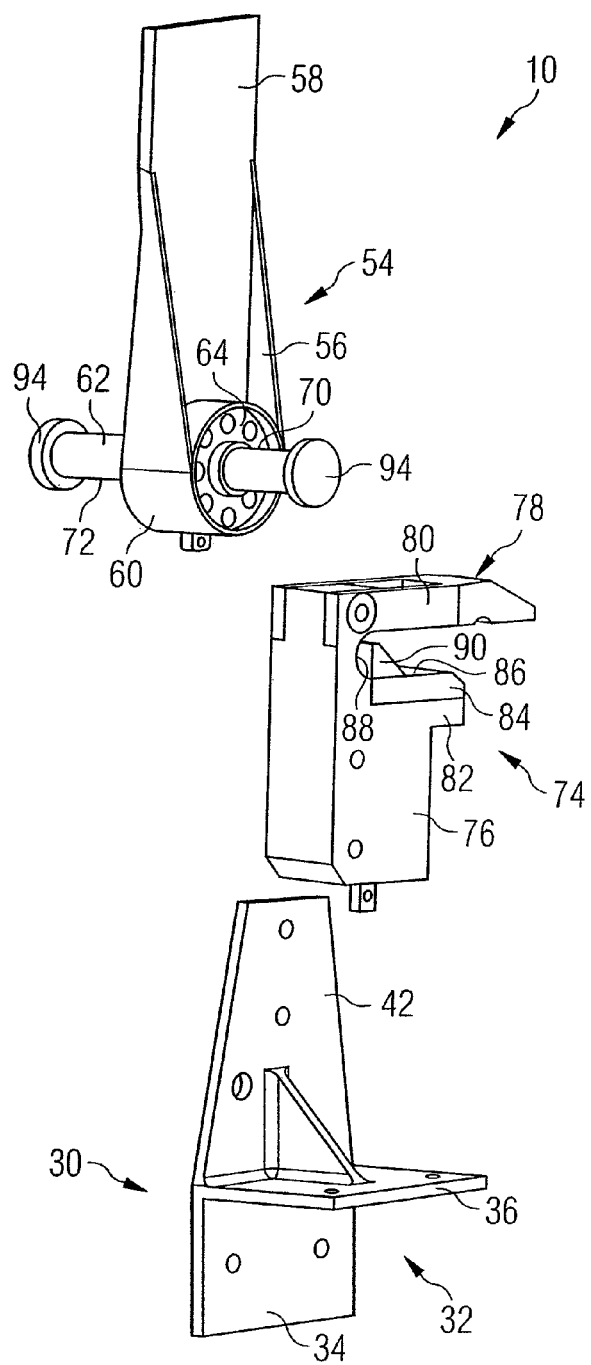
FIG. 3 shows a three-dimensional partially exploded view of the holder system according to FIG. 1.
Figure 4:
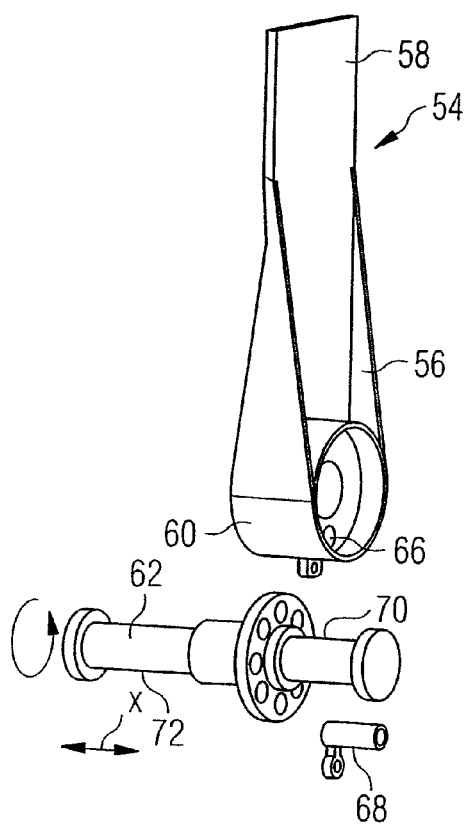
FIG. 4 shows a three-dimensional exploded view of a structure holder of the holder system according to FIG. 1.

As can best be seen in FIG. 3, the gripping arrangement 78 of the connecting element 74 further comprises a securing device 90 which serves for securing the gripping arrangement 78 in its position when, on connecting the connecting element 74 to the structure holder 54, a mounting shaft 62 of the structure holder 74 has been received in a desired position in the gripping arrangement 78. The securing device 90 is configured in the form of a spring-loaded bolt which extends from the second bearing surface 86 of the gripping arrangement 78. On its side directed towards the open end of the gripping arrangement 78, the bolt is provided with an inclined guiding surface which facilitates the insertion of a receiving device 70, 72 of the mounting shaft 62 into the gripping arrangement 78. Furthermore, the insertion of a receiving device 70, 72 of the mounting shaft 62 is facilitated by a guiding surface 92 which is inclined relative to the second bearing surface 86 and is formed on the gripping body 82.

Finally, in order to prevent the gripping arrangement 78 from slipping off the mounting shaft 62 in a direction parallel to the longitudinal axis of the mounting shaft 62, the mounting shaft 62 is provided with suitable securing elements 94 at its two ends. The securing elements 94 are formed in one piece with the mounting shaft 62 and have a greater diameter than the mounting shaft 62.

Figure 8:
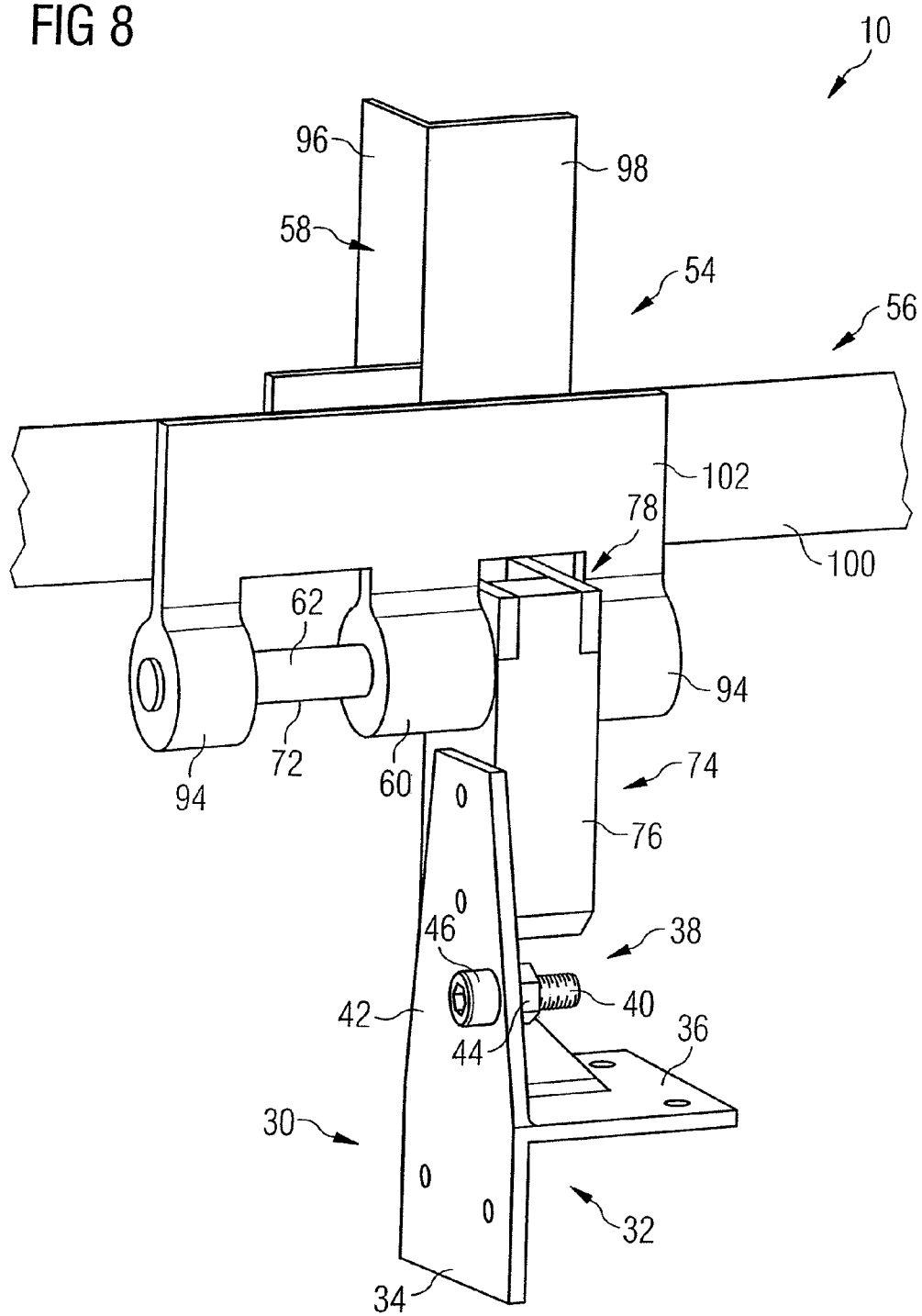
FIG. 8 shows a three-dimensional illustration of a variant embodiment of the holder system illustrated in FIGS. 1-7.

The holder system 10 shown in FIG. 8 differs from the arrangement according to FIGS. 1-7 by the configuration of the structure holder 54. In particular, the structure holder 54 of the holder system 10 illustrated in FIG. 8 comprises a fastening component 58 which comprises two plates 96, 98 arranged substantially perpendicular to one another. The plates 96, 98 are provided for connection to the aircraft structure 16, for example to a frame of the aircraft structure 16, for the purpose of fastening the structure holder 54 to the aircraft structure 16. The plate 98 of the fastening component 58 is oriented, in the mounted state of the structure holder 54 on the aircraft structure 16, substantially parallel to the longitudinal axis of the aircraft fuselage element and carries a rail 100 which likewise extends parallel to the longitudinal axis of the aircraft fuselage element in the mounted state of the structure holder 54 on the aircraft structure 16. A plurality of bearing elements 60 can be fastened to the rail 100 in a manner distributed along the longitudinal axis of the aircraft fuselage element.

A bearing element 60 is fastened to the rail 100 by a holding plate 102. The holding plate 102 is fastened to the rail 100 in such a manner that the main surfaces of the rail 100 and of the holding plate 102 are connected to one another. The holding plate 102 extends, on both sides of the bearing element 60, substantially parallel to the mounting shaft 62. Finally, the securing elements 94 arranged at the ends of the mounting shaft 62 in order to maintain a gripping arrangement 78, connected to the mounting shaft 62, in its position on the mounting shaft 62 are formed in one piece with the holding plate 102. In other respects, the construction and functioning of the holder system 10 shown in FIG. 8 correspond to the construction and functioning of the arrangement illustrated in FIGS. 1-7.

Figure 9:
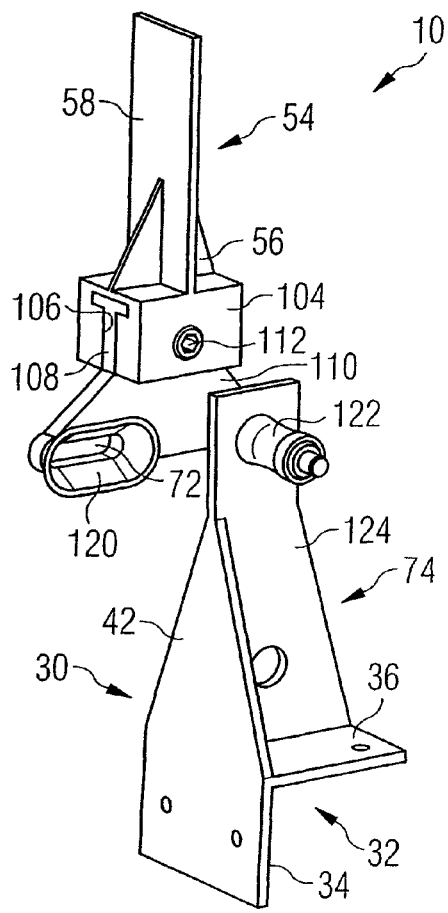
FIG. 9 shows a three-dimensional view of a further embodiment of a holder system for fastening an aircraft interior component to a transporting apparatus and to an aircraft structure.
Figure 10:
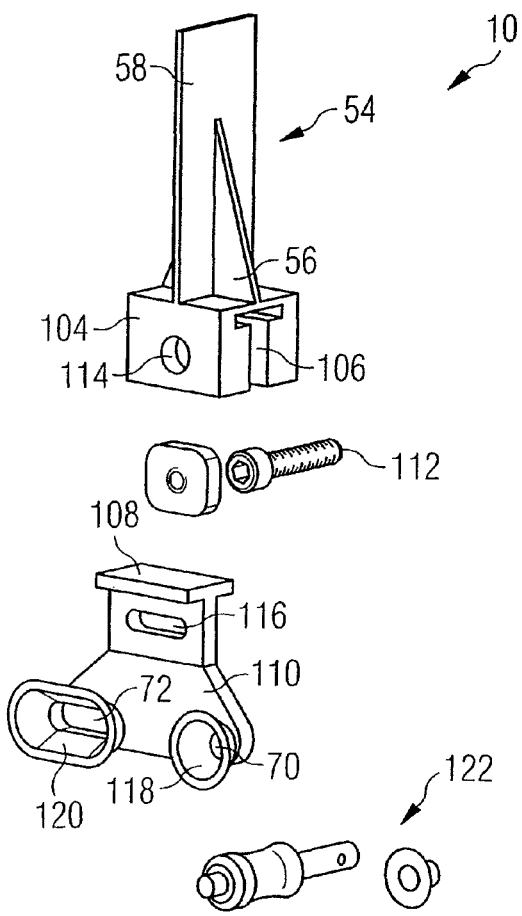
FIG. 10 shows a three-dimensional exploded view of the holder system according to FIG. 9.
Figure 10:
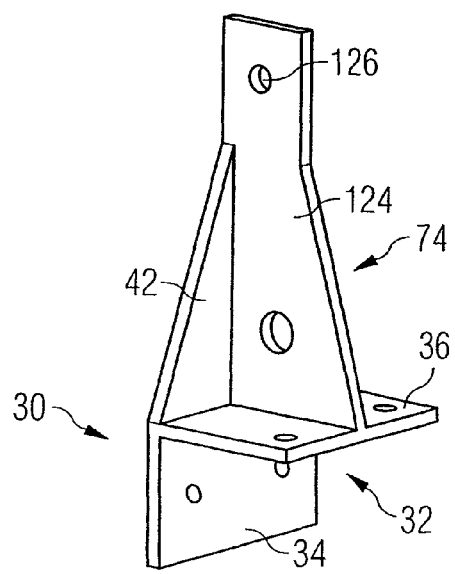

In the case of the holder system 10 shown in FIGS. 9 and 10, the structure holder 54, like the structure holder 54 of the holder system 10 shown in FIGS. 1-7, again has a plate-shaped fastening component 58 for fastening the structure holder 54 to the aircraft structure 16. Attached to the plate-shaped fastening component 58 is a substantially cuboid-shaped body 104. A T-shaped slot 106 is formed in the body 104. The slot 106 is provided for cooperating with a T-shaped projection 108 which extends from a mounting rail 110. The mounting rail 110 can be displaceably connected to the body 104 by the cooperation of the slot 106 with the projection 108. The mounting rail 110 is fixed relative to the body 104 by a bolt 112 which passes through a bore 114 formed in the body 104 and an elongated hole 116 made in the projection 108 of the mounting rail 110, see FIG. 10.

The mounting rail 110 bears a first receiving device 70 configured in the form of a bore and a second receiving device 72 configured in the form of an elongated hole 72. The first receiving device 70 can be connected to a first connecting element 74. The second receiving device 72 configured in the form of an elongated hole then enables a tolerance compensation for a further connecting element 74 provided for connection to the second receiving device 72. In particular, the tolerance compensation device is formed, in the case of a second receiving device 72 configured in the form of an elongated hole, by the regions of the elongated hole by which the area of the elongated hole is greater than a cross-sectional area of a fastening means to be received in the elongated hole.

Furthermore, guiding devices 118, 120 for guiding a fastening means 122 configured in the form of a quick release pin on connecting a connecting element 74, fastened to a corresponding interior component holder 30, to the structure holder 54 are formed on the mounting rail 110. The guiding devices 118, 120 each comprise a guiding funnel which extends from the mounting rail 110 and has a greater circumference in a region directed away from the mounting rail 110 than in a region directed towards the mounting rail 110.

Finally, the holder system 10 according to FIGS. 9 and 10 differs from the arrangements illustrated in FIGS. 1-8 by the configuration of the connecting element 74. While the holder systems 10 shown in FIGS. 1-8 comprise connecting elements 74 with a gripping arrangement 78, the connecting element 74 in the case of the holder system 10 illustrated in FIGS. 9 and 10 has a connecting plate 124. Formed in the connecting plate 174 is a bore 126, through which passes the fastening means 122 designed in the form of a quick release pin, in the state of the connecting element 74 connected to the structure holder 54. The connecting plate 124 is designed in one piece with the interior component holder 30 and extends substantially perpendicularly to the first and the second base plate 34, 36 of the interface element 32 from a surface of the second base plate 36. If desired, the coupling between the connecting element 74 and the structure holder 54 can be effected via shock mounts or another comparable device which enables acoustic and/or at least partial mechanical uncoupling of the connecting element 74 from the structure holder 54. In other respects, the construction and functioning of the holder system 10 illustrated in FIGS. 9 and 10 correspond to the construction and functioning of the arrangements shown in FIGS. 1-8.

Finally, FIGS. 11 and 12 show a further holder system 10, which differs from the arrangement according to FIGS. 9 and 10 by the configuration of the structure holder 54. In particular, the structure holder 54 of the holder system 10 according to FIGS. 11 and 12 comprises a mounting element 56 which can once again be attached to the aircraft structure 16 by means of a plate-shaped fastening component 58. Furthermore, the mounting element 56 comprises a connecting plate 128 which is connected in a desired position to a mounting rail 110 by suitable fastening means, such as, for example, screws or bolts. The mounting rail 110 extends parallel to the longitudinal axis of the aircraft fuselage element in the mounted state of the structure holder 54 on the aircraft structure 16.

The mounting rail 110 carries a plurality of first and second receiving devices 70, 72, the first receiving devices 70, like the arrangement according to FIGS. 9 and 10, being configured in the form of a bore, while the second receiving devices 72 are designed in the form of an elongated hole. To connect a connecting element 74 to a first or a second receiving device 70, 72, once again a fastening means 122 configured in the form of a quick release pin is employed. Furthermore, if desired, once again an acoustic and/or at least partial mechanical uncoupling of the connecting element 74 from the structure holder 54 can take place.

In order to facilitate the fastening of the connecting element 74 to the mounting rail 110, a main surface of the mounting rail 110 acts as a first stop element 130, which limits a horizontal mounting movement of the connecting element 74 and thus the interior component holder 30 and also the interior component 12 in the y-direction, that is to say perpendicular to the longitudinal axis of the aircraft fuselage element and perpendicular to the longitudinal axis L of a suitably positioned transporting apparatus 14. Furthermore, the mounting rail 110 is configured in the form of an L-profile, so that an upper edge of the mounting rail 110 directed towards the mounting element 56 bears a second stop element 132, which extends substantially perpendicularly to the main surface of the mounting rail 110. The second stop element 132 is provided for cooperating with an upper edge of the connecting element 74 on fastening the connecting element 74 to the mounting rail 110, in order to limit a vertical mounting movement of the connecting element 74, the interior component holder 30 and thus the interior component 12.

Finally, a third stop element 134 configured in the form of a stop projection extends from the main surface of the mounting rail 110. Through the cooperation of the third stop element 134 with a lateral surface of the connecting element 74, the connecting element 74, the interior component holder 30 and the interior component 12 can be positioned as desired horizontally in the x-direction, that is to say parallel to the longitudinal axis of the aircraft fuselage element and parallel to the longitudinal axis L of a suitably positioned transporting apparatus 14. In other respects, the construction and functioning of the holder system 10 shown in FIGS. 11 and 12 correspond to the construction and functioning of the arrangement shown in FIGS. 9 and 10.

What is claimed is:

1. An aircraft holder system for fastening an aircraft interior component to an aircraft structure and to a transporting apparatus to transport the aircraft interior component fastened thereto to the aircraft structure for subsequent fastening of the aircraft interior component to the aircraft structure, the transporting apparatus having a carriage unit mounted to a movable undercarriage, the carrier unit movable horizontally and vertically relative to the undercarriage, the holder system comprising:
    an interior component holder having an interface element fastenable to the aircraft interior component and including a fastening device to fasten the interior component holder to the carrier unit,
    a structure holder including a mounting element fastenable to the aircraft structure and at least one receiving device, and
    a connecting element fastened to the interior component holder, the connecting element connectable to the at least one receiving device to connect the interior component holder to the aircraft structure via the structure holder while the interior component holder is fastened to the carrier unit of the transporting apparatus via the fastening device.

2. The aircraft holder system according to claim 1, wherein the interface element comprises at least one base plate defining a plurality of bores for receiving fastening means for fastening the interior component holder to the aircraft interior component.

3. The aircraft holder system according to claim 1, further comprising a holder fixed to the carriage unit of the transporting apparatus, wherein the fastening device of the interior component holder is received in a bearing device of a fixed bearing or a movable bearing formed on the holder fixed to the carriage unit of the transporting apparatus.

4. The aircraft holder system according to claim 1, wherein the interior component holder comprises a fastening element, and wherein the fastening device of the interior component holder comprises a bolt extending from the fastening element of the interior component holder.

5. The aircraft holder system according to claim 1, wherein the at least one receiving device of the structure holder comprises a first receiving device and a second receiving device adjacent to the first receiving device, the first and the second receiving devices cooperating with two connecting elements fastened to corresponding interior component holders.

6. The aircraft holder system according to claim 1, wherein the structure holder comprises a mounting rail, including the at least one receiving device, fastenable to the aircraft structure by the mounting element, the at least one receiving device comprising a first receiving device in the form of a bore and a second receiving device in the form of an elongated hole.

7. The aircraft holder system according to claim 6, wherein the mounting rail of the structure holder comprises a first, a second and a third stop element cooperable with the connecting element, on connecting the connecting element, to limit movement of the connecting element in all three spatial directions.

8. The aircraft holder system according to claim 6, wherein the mounting rail of the structure holder comprises at least one guiding device to guide a fastening means connecting the connecting element to at least one of the first and second receiving devices of the structure holder.

9. The aircraft holder system according to claim 8, wherein the at least one guiding device comprises a guiding funnel extending from the mounting rail and surrounding the at least one of the first and the second receiving device, the guiding funnel having a greater circumference in a region directed away from the mounting rail than in a region directed towards the mounting rail.

10. The aircraft holder system according to claim 6, wherein the mounting rail is fastenable to the mounting element in different positions.

11. The aircraft holder system according to claim 1, wherein the receiving device of the structure holder comprises a mounting shaft having a first receiving device formed by a first region of the mounting shaft and a second receiving device formed by a second region of the mounting shaft.

12. The aircraft holder system according to claim 11, wherein the mounting element of the structure holder comprises a bearing element through which the mounting shaft passes, the mounting shaft and the bearing element being configured to fasten the mounting shaft to the mounting element in different positions.

13. The aircraft holder system according to claim 1, wherein the connecting element comprises a connecting plate formed in one piece with the interior component holder.

14. The aircraft holder system according to claim 1, wherein the connecting element comprises:
    a base body fastened to the interior component holder, and
    a gripping arrangement, the gripping arrangement comprising an open end, a first bearing face, a second bearing face disposed opposite the first bearing face, and a stop face bounding the first and the second bearing face, the gripping arrangement receiving the receiving device of the structure holder between the first and second bearing faces.

15. The aircraft holder system according to claim 14, wherein the gripping arrangement of the connecting element comprises a securing device to secure the gripping arrangement in position when, on connecting the connecting element to the structure holder, the receiving device of the structure holder is received in a desired position in the gripping arrangement.

16. The aircraft holder system according to claim 5, wherein the first receiving device comprises a first portion of a mounting shaft, the first portion of the mounting shaft defining a length, and wherein the second receiving device comprises a second portion of the mounting shaft, the second portion of the mounting shaft defining a length, and wherein the first receiving device provides for tolerance compensation with the length of the first portion of the mounting shaft being greater than the length of the second portion of the mounting shaft.

17. The aircraft holder system according to claim 5, wherein the first receiving device comprises an elongated hole configured to receive a first connecting element, and wherein the second receiving device comprises a bore configured to receive a second connecting element, and wherein the first receiving device provides for tolerance compensation with the elongated hole defining an area that is greater than a cross-sectional area of the first connecting element.

\* \* \* \* \*